United States Patent [19]
Sema et al.

[11] 3,917,945
[45] Nov. 4, 1975

[54] METHOD AND APPARATUS FOR DETECTING THE DEGREE OF CONTAMINATION OF WASTE WATER

[75] Inventors: Shunzo Sema, Tokyo; Ikuo Sakurada, Kokubungi, both of Japan

[73] Assignee: Katsuhiki Hayashi, Tokyo, Japan

[22] Filed: June 10, 1974

[21] Appl. No.: 477,743

[30] Foreign Application Priority Data
June 21, 1973   Japan.............................. 48-69174
Aug. 18, 1973   Japan.......................... 48-97054[U]

[52] U.S. Cl. ................. 250/301; 250/356; 250/373
[51] Int. Cl.² ...................... G01T 1/167; G01J 1/42
[58] Field of Search .................... 250/301, 373, 356

[56] References Cited
UNITED STATES PATENTS
3,510,648   5/1970   Leger.................................. 250/301
3,581,085   5/1971   Barrett................................ 250/301

*Primary Examiner*—Harold A. Dixon
*Attorney, Agent, or Firm*—William Anthony Drucker

[57] ABSTRACT

Light is projected upon a constant flow of waste water to measure the quantity of fluorescence emitted by the constant flow and the quantities of infrared rays and ultraviolet rays absorbed by the constant flow, and the result of measurement is analyzed to determine the degree and type of contamination. The waste water is supplied into a supply tube having a free water surface on its upper end and a nozzle member is connected to the lower end of the supply tube for forming a constant lamina flow. For use in applications subjected to vibrations and wind pressure such as a ship a pair of groove shaped guide members is provided for the opposite sides of the nozzle member to stabilize the constant flow.

14 Claims, 5 Drawing Figures

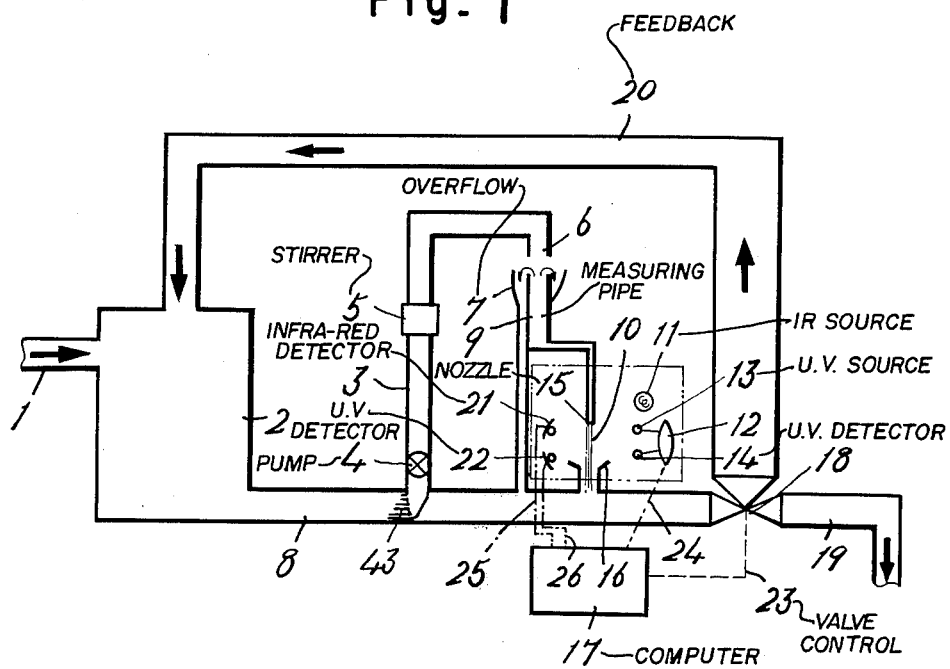

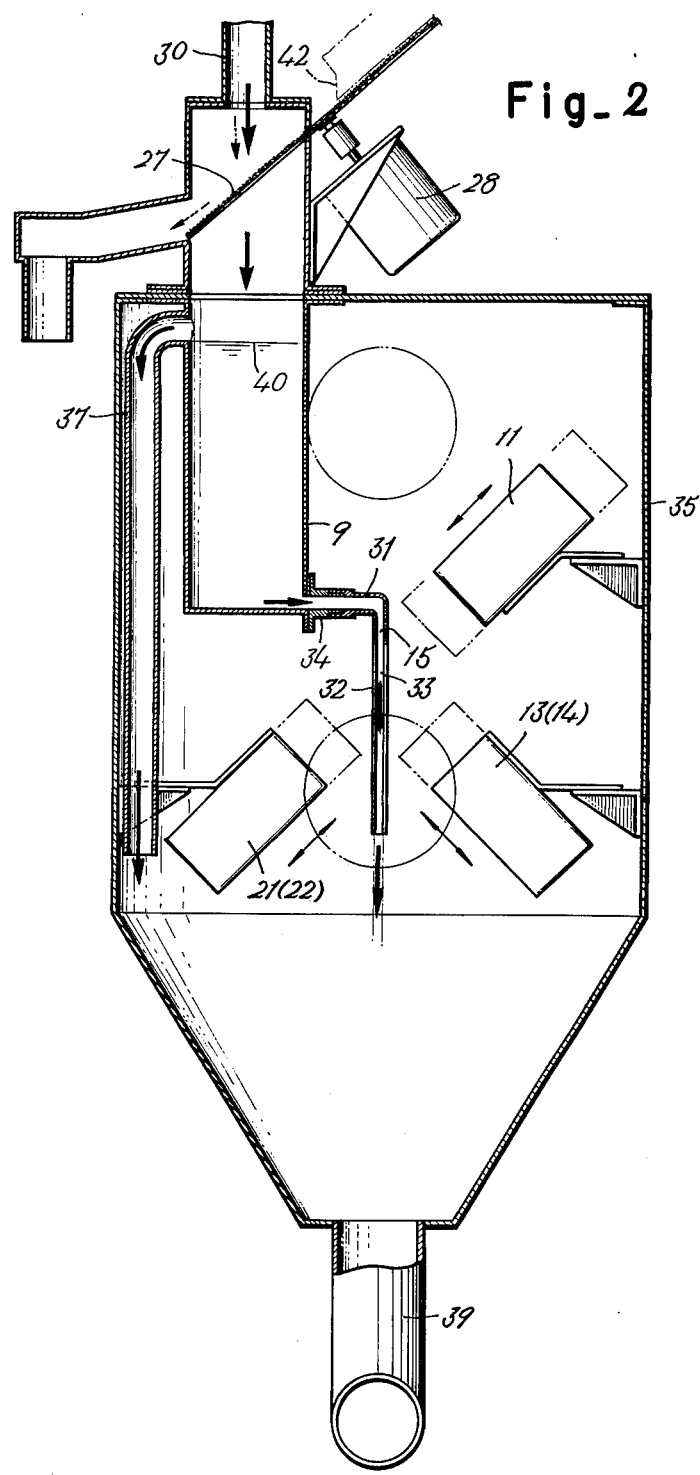
Fig_2

METHOD AND APPARATUS FOR DETECTING THE DEGREE OF CONTAMINATION OF WASTE WATER

BACKGROUND OF THE INVENTION

This invention relates to a method and apparatus for detecting the degree of contamination of waste water and more particularly to a novel method and apparatus for detecting and measuring the compositions of the contaminants contained in waste water discharged from ships, various plants, and factories.

As is well known river water and sea water in various countries are heavily contaminated by oil, chemicals or the like and it is highly desirable to prevent such contamination. Numerous methods and apparatus are now being investigated throughout the world. We have already developed an improved method of detecting and measuring heavy oil components contained in waste water discharged from ships and various installations in which the fact that the heavy oil components generally fluoresce when irradiated with ultraviolet rays is utilized for the industrial purpose and have been successfully applied in actual fields. However, the waste water discharged from ocean-going ships and land or marine installations also contains organic or inorganic compositions in addition to oil components. Moreover, certain types of the oil components contain benzene, toluene, xylene or other components that do not fluoresce. For this reason, above described method can not be used for the waste water containing oil components of such type and the result of such method can not accurately determine the type of contaminants contained in the waste water. In addition, such prior art method can not correctly determine the degree of contamination of waste water of any type. For instance, in a case wherein it is necessary to limit the quantity of the oil component contained in waste water to be less than 100 ppm, the result of the measurement obtained by such prior art method can detect only a portion of the oil components so that such method can not correctly determine the type of contamination of the waste water which contains various components. Although it is possible to determine all components by sampling the waste water by means of a test tube or the like, such method is intermittent and requires considerable labour and time so that it is not suitable for testing waste water continuously discharged in a large quantity.

SUMMARY OF THE INVENTION

Accordingly, it is an object of this invention to provide an improved method and apparatus capable of continuously determining all contamination components contained in waste water discharged in large quantity. According to this invention, lights from light sources are projected upon a constant flow of the waste water and the quantity of the luminescence emitted by the constant flow and the quantities of the infrared rays and of the ultraviolet rays absorbed by the constant flow are measured simultaneously and the result of the measurement is analyzed by a computer to determine the degree and type of the contamination.

The result of analysis is recorded on a recording chart. More precisely, the flourescence, infrared rays and ultraviolet rays are received by photoelectric receiving elements and the outputs thereof are send to a suitable computer. The quantity of the flourescence is proportional to the total oil components which fluoresce under ultraviolet irradiation, such components generally comprising the major proportion of the oils contained in the waste water. On the other hand, the absorption of the ultraviolet light is caused by various kinds of oils and other solid components contained in the waste water. The quantity of the absorbed infrared lights is nearly proportional to the solid components. Accordingly, it is possible to instantly determine any one of the components by means of an analogue computer. For example, the quantities of fluorescent oil component and the solid components are directly determined from the intensity of fluorescence and the absorption of the infrared light, respectively. The quantity of the oil components that do not fluoresce, such as benzene, toluene and xylene can be determined by subtracting the absorption for the ultraviolet light corresponding to the other oil components and the quantity of the absorbed infrared light from the quantity of the absorbed ultraviolet light. Thus, the quantities of the fluorescent oil, the non-fluorescent oil and the solid particles are determined separately. The quantity of the total oil component can be indicating the former two quantities. These procedures are performed easily with an analogue or a digital computer. In case of high concentration, the optical densities should be used instead of the absorptions. In this manner, it is possible to accurately determine complicated compositions of the contaminants. When the quantity of any one of the components exceeds a predetermined limit an alarm device may be operated.

Another object of this invention is to provide novel measuring apparatus having a relatively compact construction capable of accurately measuring the degree of contamination of waste water discharged in a large quantity. To this end, a portion of the waste water is taken out and throughly mixed to have a composition representing that of the entire waste water. At the measuring apparatus, the mixed waste water is formed into a constant flow under a predetermined static pressure, and the light sources and light receiving elements are associated with the constant flow for projecting light rays thereon and for receiving light rays transmitted through or emitted by the constant flow. Thus, the waste water supplied to the nozzle member correctly represents the entire waste water, so that the result of detection made by the light receiving elements determines the degree and type of contamination of the entire waste water. Moreover, as the measuring apparatus is constructed to operate with relatively small quantity of the waste water it is possible to construct it as a compact unit thereby eliminating the necessity of using a large measuring apparatus for the waste water of large volume. In this manner, it is possible to measure the degree of contamination by means of a small and compact measuring apparatus regardless of the variation of the quantity of the waste water.

Another important object of this invention is to provide accurate measuring apparatus not influenced by vibration. A typical source of the waste water is an ocean-going ship which is subjected to vibrations caused by waves. The vibration caused by the operation of the engine is also severe. Even on the land, most installations which discharge waste water includes an engine or an electric motor which generates vibration. When subjected to such vibration, the lamina flow formed by the nozzle member tends to spread due to the surface tension of the water thereby causing the variation in thickness of the lamina flow and rendering errors in the optical measurement. According to this invention, a pair of groove shaped guide members is provided for opposite sides of the nozzle member so as to stabilize lamina flow. Then the lamina flow will be guided by the guide members so as to maintain the thickness of lamina flow at a constant value, thus ensuring accurate measurement by optical means.

BRIEF DESCRIPTION OF THE DRAWINGS

Further objects and advantages of the invention can be more fully understood from the following detailed description taken in conjunction with the accompanying drawings in which:

FIG. 1 is a diagrammatic representation of the apparatus embodying the invention;

FIG. 2 is an enlarged sectional view showing a nozzle and a detecting mechanism utilized in the apparatus shown in the FIG. 1;

DESCRIPTION OF THE PREFERRED EMBODIMENT

Figure 4:
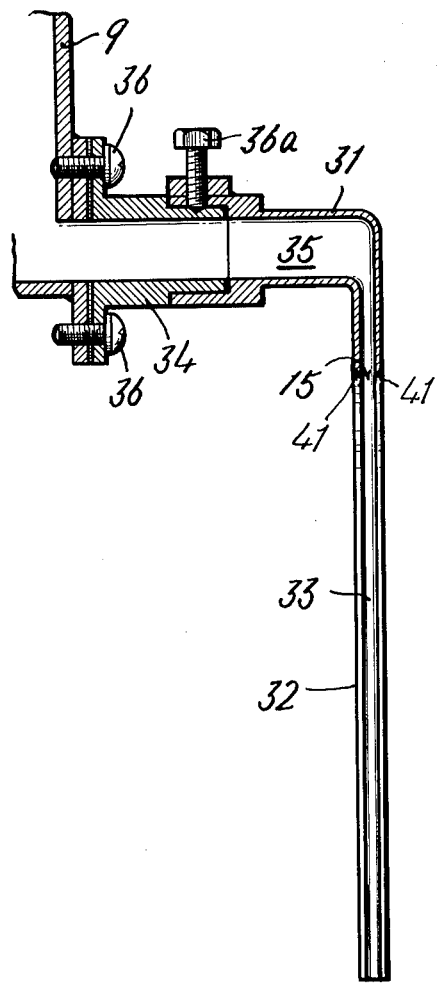
FIG. 4 is a longitudinal sectional view of the nozzle shown in the FIG. 3.

Referring now to FIG. 1 of the accompanying drawing, waste water, such as the bilge water of a ship and discharged from a drain pipe 1 is admitted into an oil-water separating tank 2 and then conveyed to the outside through a main drain pipe 8, a valve mechanism 18, and a discharge opening 19. According to this invention, a bypass pipe 3 for measurement is connected in parallel with the main drain pipe 8 for shunting a portion of the waste water. The bypass pipe 3 includes a pump 4 and a stirring mechanism 5 so that a portion of the waste water is stirred and mixed and then supplied to a discharge port 6 to flow downwardly. At the inlet of the bypass pipe 3 is disposed a multi-stage inlet device 43 for uniformly shunting the waste water from various portions of the cross-section of the pipe 8. A measuring liquid supply pipe 9 is positioned beneath the dishcarge port 6 and the upper end of the supply pipe 9 is surrounded by an annular member 7 for collecting overflowing water so as to return the overflown water back to the main drain pipe 8. The lower end of the measuring liquid supply pipe 9 is terminated with a nozzle 15 which is constructed to form a lamina flow 10 of a predetermined thickness. The lamina flow 10 is received by a receiver 16 for returning it back to the main pipe 8. Thus, the lamina flow 10 formed by the nozzle pipe 15 is used as a detection region and this flow is formed under a constant static head determined by the height of the measuring liquid supply pipe 9 even when the quantity of the homogenized water discharged from the stirring mechanism 5. In other words, the thickness and the flow rate of the lamina flow 10 are maintained always at contant values independently of the liquid pressures provided by the pump 4 and an exhaust pump (not shown) connected in the drain pipe 1. It is particularly to be noted that since the lamina flow is made completely independent of the liquid pressure, and since the liquid pressure due to the contant static head is not so high, the water is never ejected from the nozzle 15 under an appreciable pressure but flows down naturally to form the lamina flow, so that it is possible to increase the accuracy of the optical measurement described below at the detection region. The optical detector comprises light sources 11 and 13, the former emitting near infrared rays and the latter comprising a mercury lamp or the like which emits light utilized to cause fluorescence by the heavy oil component in the waste water. The resulting fluorescence is received by a light receiver 14 located beneath the source 13. The infrared rays from the source 11, not absorbed by the lamina flow 10, are received by a light receiver 21 located on the rear side of the lamina flow while the ultraviolet rays are received by the light receiver 22 also located on the rear side. Each of the light receivers 14, 21 and 22 may comprise a well known photoelectric element and the outputs of respective light receivers are sent to a computer 17 over conductors 24, 25 and 26 where the outputs are suitably processed to measure and record the fluorescent oil component, the total oil component and the total contaminants. The computer 17 is provided with an output operating circuit 23 for operating a switching valve 18 whenever either one of the components measured or the result of the operation exceeds a predetermined value so as to returning the waste water flowing through the main drain pipe 8 toward the discharge port 19 back to the oil-water separator 2 through a feedback pipe 20. It is also possible to operate a suitable alarming device, not shown, by the operating circuit 23 whenever the degree of contamination exceeds a predetermined value.

Figure 3:
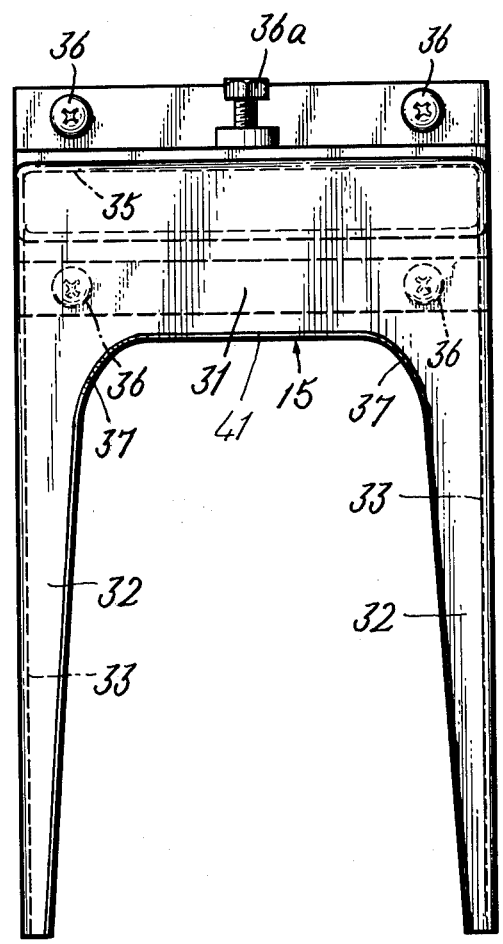
FIG. 3 is a front view of the nozzle shown in the FIG. 2.

The FIGS. 2 to 4 illustrate one example of a nozzle which can be mounted on a ship or the like for accurate measurement of contamination of the waste water. As shown, a connection 30 on the upper surface of a casing 35 is connected to the discharge port 6 shown in the FIG. 1 so that the waste water pumped by pump 4 through the stirrer 5 will be supplied into casing 35. An inclined filter 27 is located beneath the connection 30, the filter being formed of a metal wire net and rotated by an electric motor 28. Thus, a portion of the filter 27 which is not yet used is always brought into the operative position beneath the connection 30 to filter coarse components of the contaminants, such as sand, sludge, and chips of fabric and wood. The trapped coarse components are discharged to the outside through a discharge port located on one side of the filter 27. Where it is necessary to measure the quantity of these coarse components, a suitable measuring device is available. The coarse components deposited on the filter 27 can be removed by a vacuum suction nozzle 42 disposed on the outside of the casing 35.

The waste water passed through the filter 27 and containing oil component and or fine particles is supplied to the measuring liquid supply pipe 9 located beneath the filter. An overflow tube 37 is connected to one side of the free surface 40 to overflow excess water in the same manner as in the FIG. 1. A letter L shaped nozzle member 31 is connected to the lower end of the supply pipe 9 through a fixture 34. As shown in the FIGS. 3 and 4, member 31 has a flat rectangular passage 35 and the nozzle 15 connected to this passage is provided with downwardly extending channel shaped guide members 32 defining a groove 33 having the same width as the nozzle 15. The lower edges 41 of the nozzle 15 are connected to the side edges of the guide members 32 through arcuate or curved portions 37 so as to stabilize the lamina flow formed by the nozzle. The nozzle member 31 is connected to the fixture 34 by a bolt 36a while the fixture 34 is connected to the supply pipe 9 by screws 36. In the example shown in the FIG. 2, the water through the overflow tube 31 and the lamina flow are gathered together at the bottom of the casing 35 and are then returned back to the main drain pipe 8 through a discharge pipe 39. Of course, this arrangement does not interfere with the desired detection and measuring operation. In the same manner as in the FIG. 1, light sources 11 and 13 and light receivers 14, 21 and 22 are disposed on the opposite sides of the lamina flow. These light sources and light receivers may be located horizontally instead of vertically as shown in the FIG. 1.

With the construction shown in the FIGS. 2 to 4, the waste water flowing downwardly through nozzle 15 forms a lamina flow having a preferred definite configuration because the opposite ends of the lamina flow are pulled away by the adhering force of the water to the groove shaped guide members 32 which is assisted by the surface tension of the water. For this reason, the measuring apparatus of this invention can form a stable lamina flow not affected by the repeated rolling and pitching of the ship carrying the apparatus thereby assuring accurate measurement under the same condition whether the measurement is made by utilizing the light transmitted through or reflected by the lamina flow. Although most of the coarse particles in the waste water are removed by the filter 27, should the nozzle member 31 become clogged, it can be readily cleaned by dismounting it by loosening the bolt 36a and screws 36.

One example of this invention as applied to the measurement of contamination of waste water discharged from a ship is as follows. As the light source 11 for projecting near infrared rays was used a gallium arsenide lamp whereas a mercury lamp (GL 6, 100 V, manufactured by Tokyo Shibaura Electric Co.) was used as the source 13 for ultraviolet rays. Photoelectric tubes (for example photomultiplier tubes) or semiconductors (for example solar cells) were used as the light receivers 14, 21 and 22 for receiving fluorescent rays and ultraviolet rays. Where photo-multiplier tubes were used for receiving fluorescent and ultraviolet rays, and a silicon semiconductor element for receiving near or far infrared rays in the measurement of the concentration of the contaminants in the bilge water of a 8000 ton tanker, a record as shown in the FIG. 5 was obtained. In the FIG. 5, the curve A represents variation in the concentration of contaminants corresponding to the total oil components in the waste water which was obtained from the difference between the quantities of the absorbed ultraviolet rays and of the absorbed near infrared rays and the quantity of the fluorescence, the curve B shows the variation of concentration of heavy oil composition resulting in the variation of fluorescence, and the curve C shows the variation in quantity of the absorbed ultraviolet rays, that is quantity of the ultraviolet rays absorbed by the total contaminants contained in the waste water. The waste water was sampled at times $S_1$, $S_2$, $S_3$ and $S_4$ and the oil component was measured by the standard method utilizing normal hexane, and the following result was obtained.

| Time | Concentration of oil component (ppm) |
|---|---|
| $S_1$ | 91 |
| $S_2$ | 89 |
| $S_3$ | 100.5 |
| $S_4$ | 98 |

Figure 5:
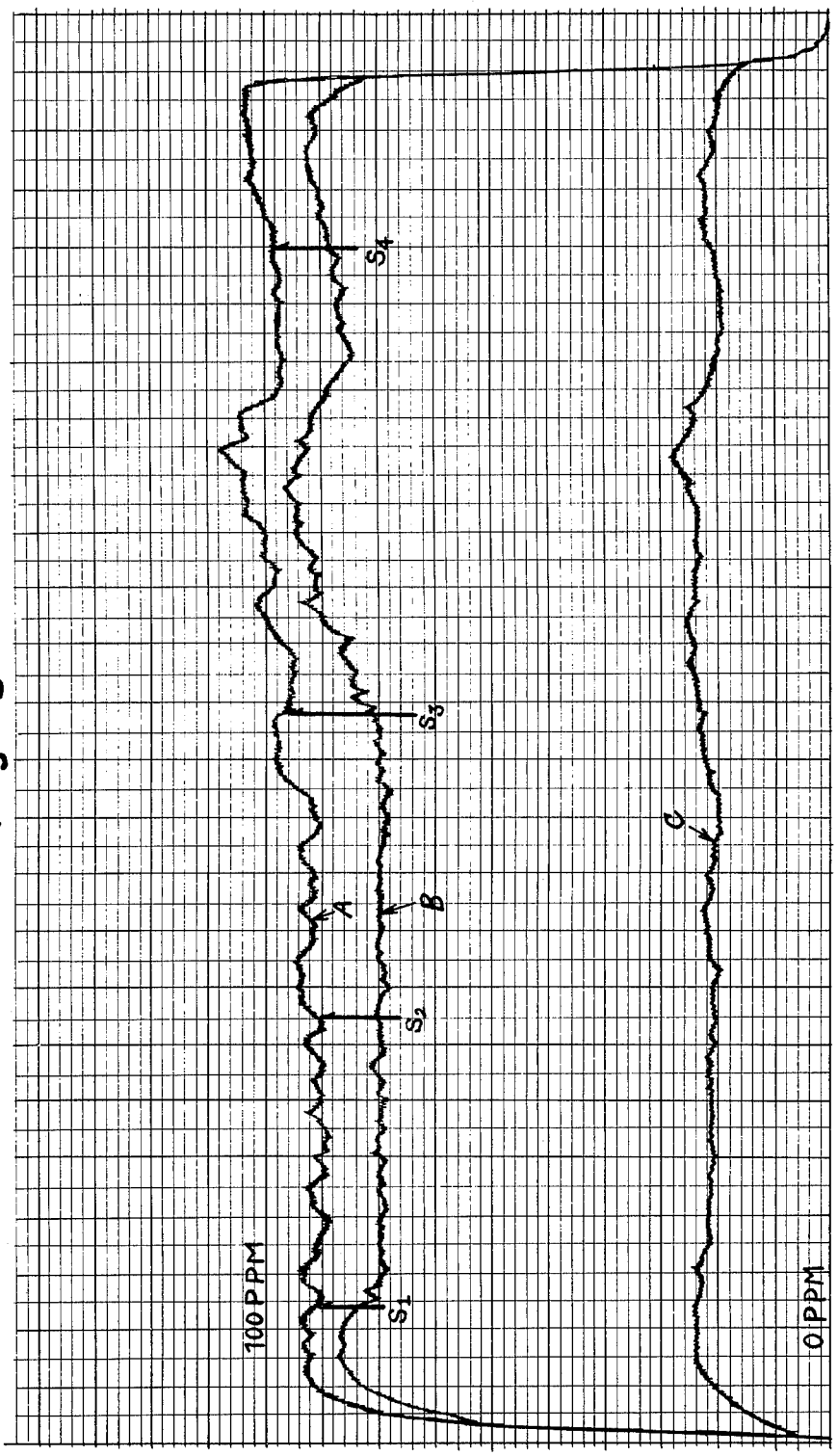
FIG. 5 shows a copy of recording chart obtained by the apparatus of this invention.

By comprising this result with that shown in the FIG. 5, it will be understood that the results substantially coincide with each other, and proved its high accuracy of continuous measurement.

The computer used in this example is an analogue computer.

Although the invention has been shown and described in terms of a preferred embodiment thereof, it should be understood that the invention is not limited to such specific embodiment and that many changes and modifications will be obvious to one skilled in the art without departing from the scope of the invention as defined in the appended claims.

What is claimed is:

1. A method of measuring the degree of contamination of waste water, comprising the steps of forming a constant flow of the waste water, projecting light upon said constant flow, detecting the quantity of fluorescence emitted by said constant flow and the quantities of the infrared rays and ultraviolet rays absorbed by said constant flow, and analyzing the result of detection for determining the degree of contamination of the waste water.

2. The method according to the claim 1 wherein said constant flow is formed by shunting a portion of the waste water flowing through a main drain pipe to flow into a vertical tube, forming a free water surface in said tube, overflowing excess water, thereby causing the water contained in said tube to flow down naturally under a substantially constant static head without being ejected under pressure.

3. The method according to the claim 1 wherein said constant flow is formed as a lamina flow of a constant thickness by using a nozzle provided with groove shaped guide members on the opposite sides.

4. The method according to the claim 1 wherein the total oil components in the waste water is obtained by substracting the contributions of the luminescent oil and solid particle components from the quantity of the absorbed ultraviolet ray and then adding to the difference the quantity of fluorescent oil components, and the quantities of the fluorescent oil and solid particle components are determined from the fluorescent intensity and the infrared absorption, respectively.

5. The method according to the claim 1 wherein the quantities of benzene, toluene, xylene and other nonfluorescent oil compositions are determined by subtracting the quantity of the absorbed infrared rays and the contribution of the fluorescent oil component from the quantity of the absorbed ultraviolet rays.

6. The method according to the claim 1 wherein said calculations are performed by an analogue computers.

7. Apparatus for measuring the degree of contamination of waste water comprising a bypass pipe connected to a main drain pipe for passing waste water, a measuring water supply pipe provided at the discharge end of said bypass pipe, a nozzle member provided at the lower end of said measuring water supply pipe for forming a constant flow of the waste water, a source of light, means for receiving the fluorescence emitted by said constant flow and means for measuring the quantities of the infrared rays and ultraviolet rays absorbed by said constant flow, said source of light and said means being associated with said constant flow.

8. The apparatus according to the claim 7 wherein said light source comprises a gallium arsenide lamp for emitting infrared rays and a mercury lamp for emitting light which cause said constant flow to luminesce.

9. The apparatus according to the claim 7 wherein said measuring water supply pipe is provided with an overflow pipe for establishing a definite static head between said overflow pipe and said nozzle member.

10. The apparatus according to the claim 7 wherein said means for receiving said fluorescence and said means for measuring the quantities of the absorbed infrared and ultraviolet rays comprise photoelectric elements and wherein a computer is connected to receive the outputs of said photoelectric elements.

11. The apparatus according to the claim 10 which further comprises an oil-water separating tank and a switching valve connected to said main drain pipe, a feedback pipe connected between said switching valve and said oil-water separating tank and means operated by the output from said computer for operating said switching valve so as to circulate the water in said main drain pipe back to said oil-water separating tank.

12. The apparatus according to the claim 7 wherein said nozzle means has a flat rectangular cross-section and is provided with a pair of groove shaped guide members on the opposite ends of the nozzle member so as to form a lamina flow of a constant thickness.

13. The apparatus according to the claim 7 wherein said nozzle member is connected to said measuring liquid supply pipe through a fixture.

14. The apparatus according to the claim 7 which further includes a filter located between said bypass pipe and said measuring liquid supply pipe so as to remove relatively coarse contaminants contained in said waste water.

* * * * *

UNITED STATES PATENT OFFICE
CERTIFICATE OF CORRECTION

Patent No. 3,917,945        Dated November 4, 1976

Inventor(s) Shunzo Sema et al.

It is certified that error appears in the above-identified patent and that said Letters Patent are hereby corrected as shown below:

The assignee should read -- Katsuhiko Hayashi --.

Signed and Sealed this

Thirtieth Day of November 1976

[SEAL]

*Attest:*

RUTH C. MASON
*Attesting Officer*

C. MARSHALL DANN
*Commissioner of Patents and Trademarks*